US012591642B2

(12) United States Patent
Deshpande et al.

(10) Patent No.: US 12,591,642 B2
(45) Date of Patent: Mar. 31, 2026

(54) SYSTEM FOR STEGANALYSIS DETECTION OF METADATA IN A VIDEO STREAM FOR PROVIDING REAL-TIME DATA

(71) Applicant: BANK OF AMERICA CORPORATION, Charlotte, NC (US)

(72) Inventors: Nimish Ravindra Deshpande, Maharashtra (IN); Jatin Chopra, Haryana (IN); Nitin Gaur, New Delhi (IN); Roshan Miranda, Maharashtra (IN); Balwant Singh, New Delhi (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 133 days.

(21) Appl. No.: 18/382,129

(22) Filed: Oct. 20, 2023

(65) Prior Publication Data

US 2025/0133250 A1     Apr. 24, 2025

(51) Int. Cl.
| | |
|---|---|
| *G06F 21/16* | (2013.01) |
| *H04N 21/2389* | (2011.01) |
| *H04N 21/258* | (2011.01) |
| *H04N 21/8358* | (2011.01) |
| *H04W 12/03* | (2021.01) |

(52) U.S. Cl.
CPC ....... *G06F 21/16* (2013.01); *H04N 21/23892* (2013.01); *H04N 21/25891* (2013.01); *H04N 21/8358* (2013.01); *H04W 12/03* (2021.01)

(58) Field of Classification Search
CPC ............. H04N 21/8358; H04N 21/812; H04N 21/44008; H04N 21/23892; H04N 21/25891; H04N 21/4353; H04N 21/4722; H04N 21/4725; H04N 21/4508; H04N 21/4516; H04N 21/4518; H04N 21/4524; H04N 21/4532; H04W 12/03; G06F 21/16
See application file for complete search history.

(56) References Cited

U.S. PATENT DOCUMENTS

| | | | | |
|---|---|---|---|---|
| 11,064,149 B1 * | 7/2021 | Paun | .................. | H04N 21/8133 |
| 2015/0113557 A1 * | 4/2015 | Kim | .................. | H04N 1/32767 725/32 |
| 2018/0131976 A1 * | 5/2018 | Zabelin | ................ | H04N 21/812 |
| 2021/0400472 A1 * | 12/2021 | Aumasson | ............ | H04L 9/3242 |
| 2022/0027979 A1 * | 1/2022 | Bruno | ................ | G06Q 30/0251 |
| 2022/0036495 A1 * | 2/2022 | Reed | .................. | H04N 21/8358 |

* cited by examiner

*Primary Examiner* — Jeremy S Duffield
(74) *Attorney, Agent, or Firm* — Moore & Van Allen PLLC; Nicholas C. Russell

(57)     ABSTRACT

Systems, computer program products, and methods are described herein for steganalysis detection of metadata in a video stream for providing real-time data. An encrypted steganalysis marker is positioned within a boarder of a video stream and, upon user device scanning and identification provides a communication channel for real-time data display on the user device. The data displayed on the user device is transmitted via narrowband internet-of-things communication linkage displaying product or service data associated with the video stream. Using a combination of NB-IoT and computational memory computing creates a unique, in user device computing structure with various variable inputs to provide specified data and recommendations to the user.

20 Claims, 5 Drawing Sheets

SYSTEM FOR STEGANALYSIS DETECTION OF METADATA IN A VIDEO STREAM FOR PROVIDING REAL-TIME DATA

BACKGROUND

Entities rely on traditional search utilities using text or of voice inputs for interactions. These traditional search utilities can be inefficient, cumbersome, and time consuming without allowing for personalized interaction interface applications. As such, a need exists for providing real-time data for interactions to users.

BRIEF SUMMARY

Systems, methods, and computer program products are provided for steganalysis detection of metadata in a video stream for providing real-time data.

The system includes an internal application for steganalysis detection of metadata in a video stream for providing real-time data. A marker is positioned within a boarder of a video stream, such as an advertisement, television show, movie, or the like. Entities will embed brand details along with other metadata in the marker on the borders of the video stream to run in open spaces. A key is used to embed the marker and will be provided in the application designed for reading this information and will be repurposed across all video streams via a user device.

A user device may utilize its camera function to identify the marker using steganalysis. The user device is then transformed to allow for passing of information to provide real-time data using the hardware associated with the user device. The scanning of the marker identifies a location, time, product, promotion, or the like associated with the product or service on the video stream. As such, the user who as an application installed on the user device will have ability to use live stream of a video and using steganalysis detect hidden message in a stego to identify the brand/product/location. Since the data to be read is available in the borders and is spread throughout multiple times, low resolution or video grabs from distance will not impact identification of the target product.

A combination narrowband Internet-of-thing (NB-IoT) and computational memory computing creates a unique in user device computing of various variable inputs to provide real-time data and recommendations to the user.

Embodiments of the present invention address the above needs and/or achieve other advantages by providing apparatuses (e.g., a system, computer program product, and/or other devices) and methods for steganalysis detection of metadata in a video stream, the invention comprising: creating a consortium of entities with access to generate an encrypted code for a product or service presented on a video stream; embedding the encrypted code as a marker on a boarder of the video stream; scanning, using a user device, the video stream with the marker embedded; opening an application associated with the marker on the user device; integrating narrowband Internet-of-Things (NB-IoT) to allow for entities of the consortium to broadcast; transmitting encrypted codes with real-time contextual data via a one-way transmission using the NB-IoT; allowing user device decryption of codes using key associated with the application associated with the marker; determining user preference data via user device location information and computational memory computing; and displaying output of the real-time contextual data and the user preference data to user via a display on the user device.

In some embodiments, integrating NB-IoT further comprises using NB-IoT for the consortium of entities to provide real-time contextual information about the product or the service without interrupting the memory and processing of the user device and without using an entity network.

In some embodiments, the real-time contextual data comprises real-time product or service information, opportunities, and locations for product or service access from an entity associated with the consortium of entities.

In some embodiments, the user preference data further comprises user device temporal preference data and computational memory computing data.

In some embodiments, embedding the encrypted code as the marker on the boarder of the video stream further comprises using steganography to embed the encrypted code as the marker.

In some embodiments, the encrypted code for the product or service on a video stream further comprises information about the product or the service, offers for the product or the service, and locations for the product or the service.

In some embodiments, computational memory computing further comprises employing memory elements from the user device to both store and process user preferences for user preference data.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
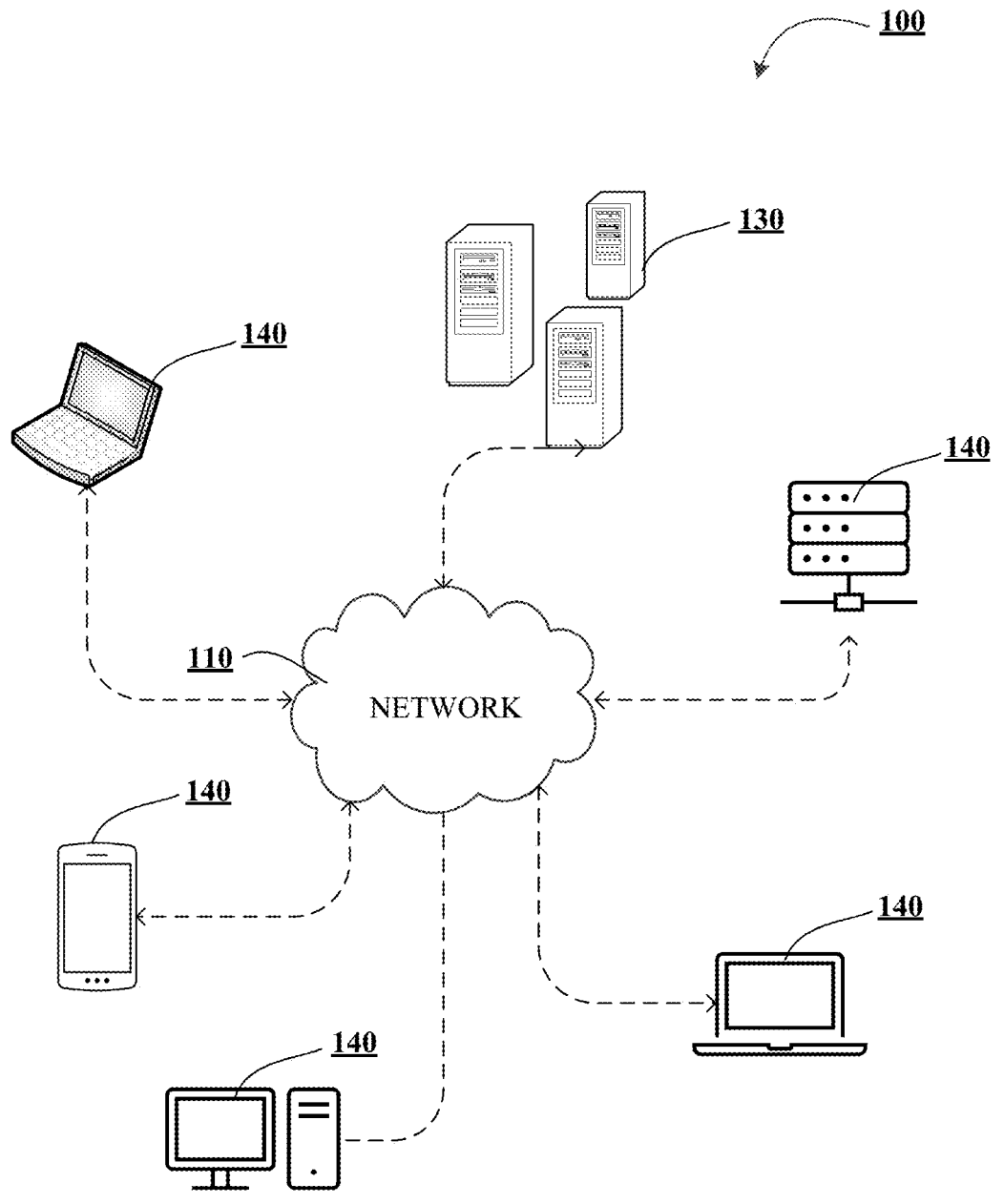
Figure 1B:
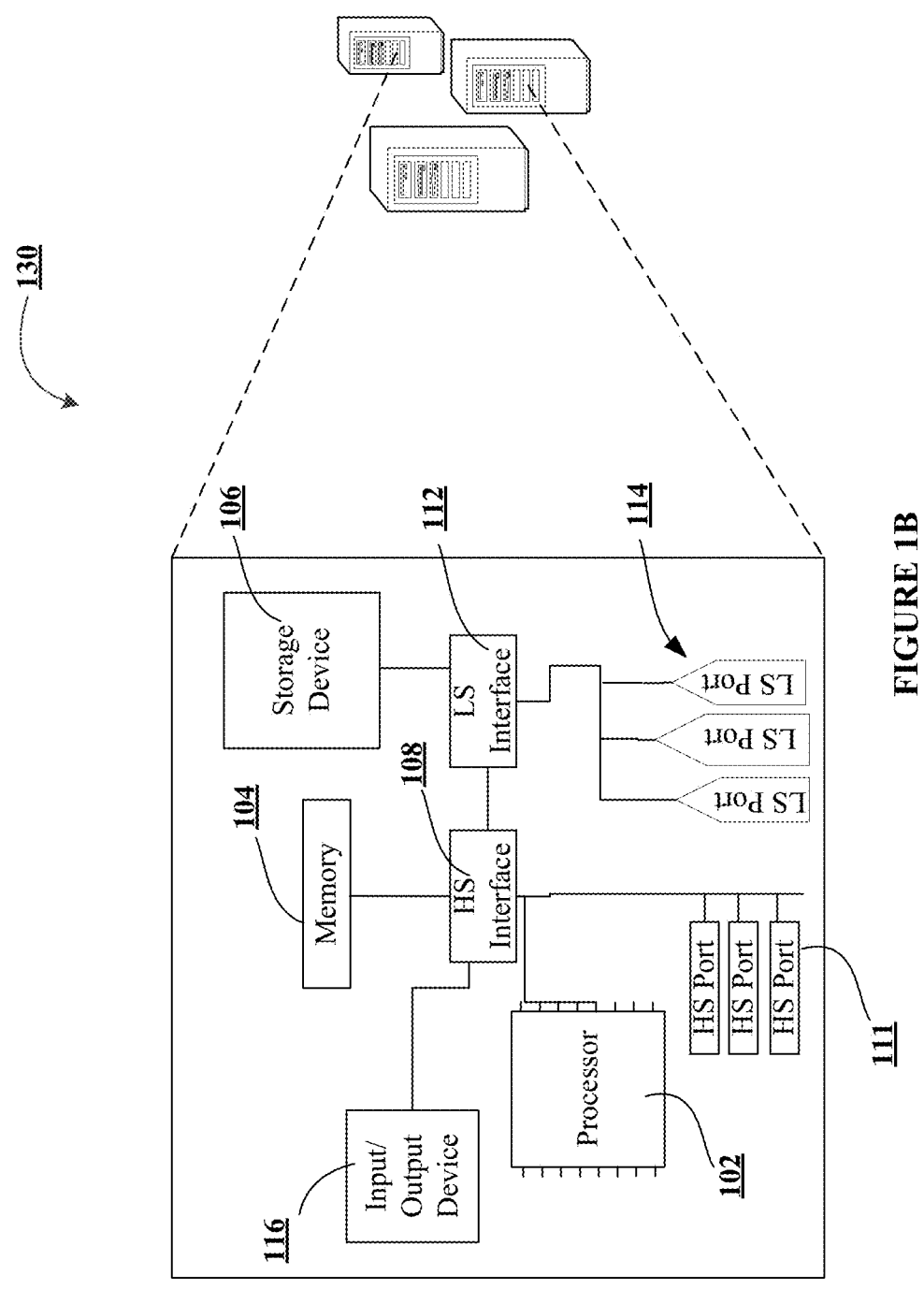
Figure 1C:
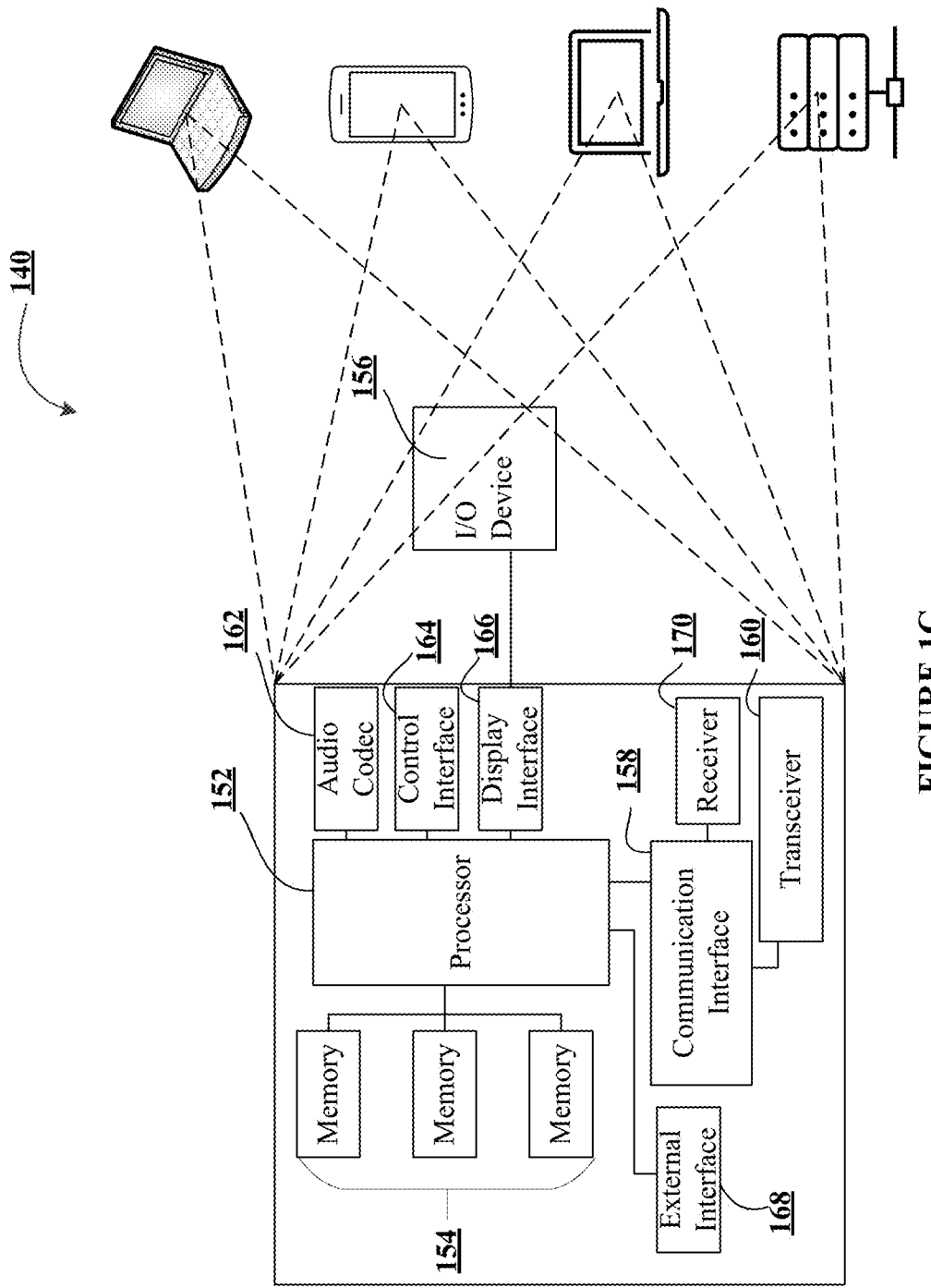
Figure 2:
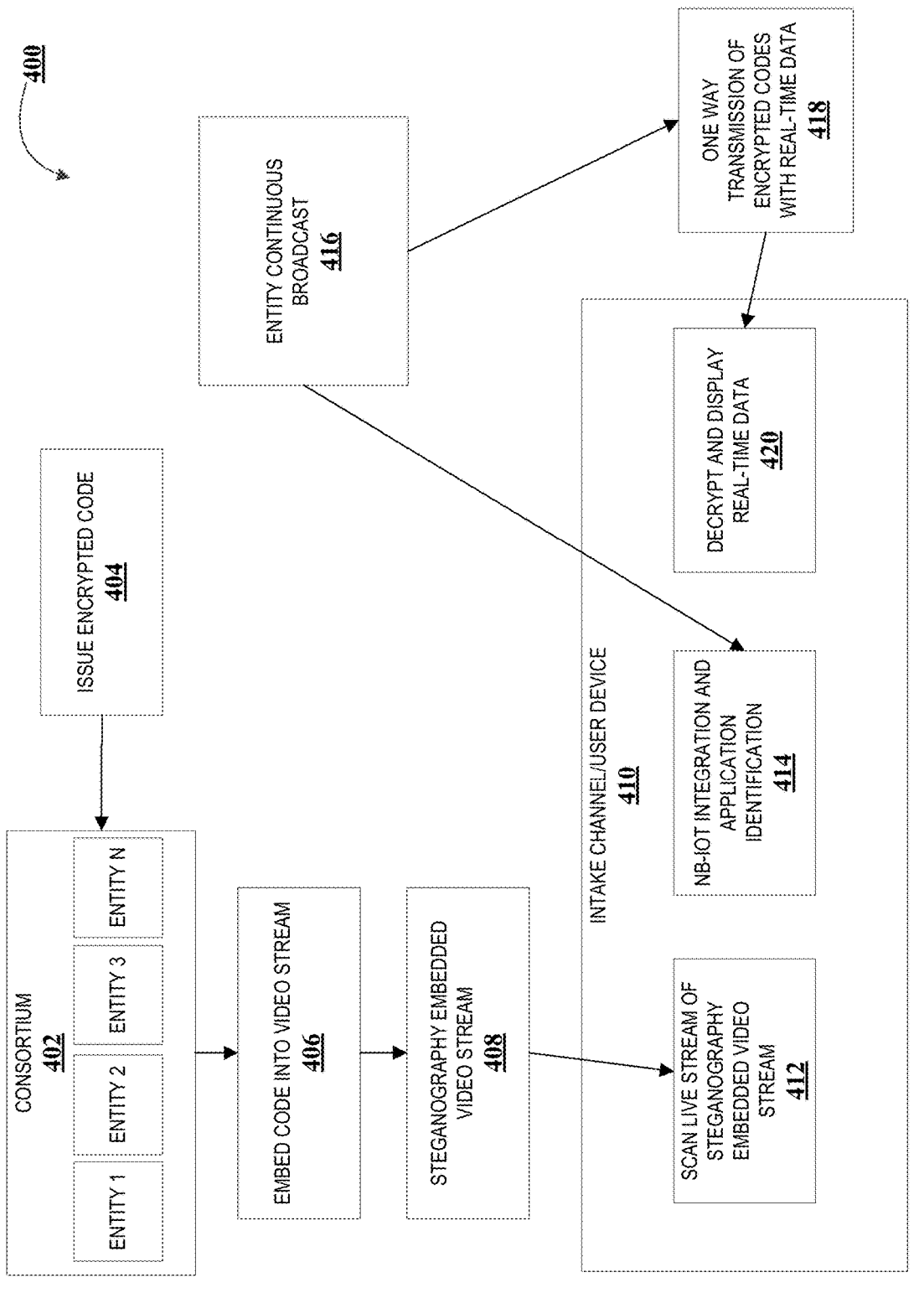
Figure 3:
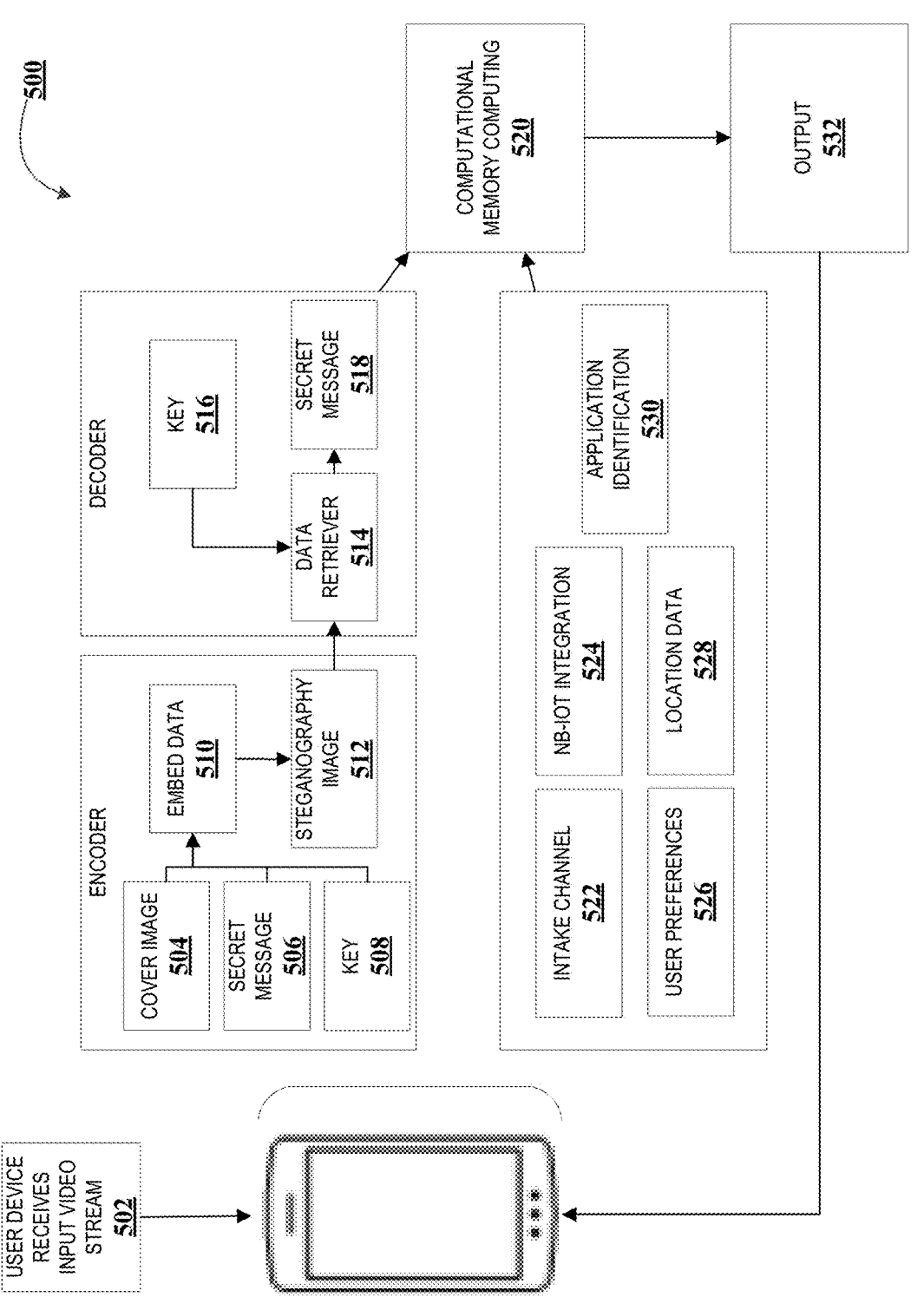

FIGS. 1A-1C illustrates technical components of an exemplary distributed computing environment for steganalysis detection of metadata in a video stream, in accordance with an embodiment of the disclosure;

FIG. 2 illustrates a process flow for real-time data presentation resulting from steganalysis detection of metadata in a video stream, in accordance with an embodiment of the disclosure; and FIG. 3 illustrates a process flow for triggering steganalysis detection of metadata in a video stream, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

In some embodiments, the degradation determination system may train, on a regular interval, the artificial intelligence model. As used herein, "train" may refer to any training, configuring, reconfiguring, and/or the like, the artificial intelligence model so the artificial intelligence model may perceive, interpret, learn, and/or the like. In some embodiments, the artificial intelligence model may be trained with data that has been previously used in the system (e.g., old data). In some embodiments, the artificial intelligence model may be trained with data that has not been previously used in the system (e.g., new data). In some embodiments, the artificial intelligence model may be trained with a combination of old and new data.

As used herein, a "regular interval" may be any interval appropriate for training the artificial intelligence model. In some embodiments, the regular interval may include training the artificial intelligence model on a continuous basis. In some embodiments, the interval may be based upon a timeframe interval (e.g., years, months, weeks, days, hours, minutes, seconds, and/or the like), a maintenance interval (e.g., based upon certain performance metrics of the system, or the like), a system usage interval (e.g., based upon a certain number of uses or operations of the system, or the like), a fault interval (e.g., based upon the system performing below an expected or accepted level of performance), and/or the like.

Entities rely on traditional search utilities using text or of voice inputs for interactions. These traditional search utilities can be inefficient, cumbersome, and time consuming without allowing for personalized interaction interface applications, which leads to lost interaction touch points. Furthermore, traditional search utilities have not been embedded into real-time personalization, campaign development, customer service, and the like. In traditional search utilities the non-optimal computing resources, latency issues, network connectivity, and server-side computation prevent real-time inputs from occurring. Traditional searches using video feeds require high data speed for transferring large data packets which are typically unavailable. From a user search perspective, traditional text searches require several clicks/inputs and often text searches require exact jargons/linguistic for accurate results hence many a times are inefficient and imprecise.

Currently there is a lack of integration of real-time user searches with relevant products or services due to unavailability of user-specific recommendations based on targeted logistics which is further exasperated by non-availability of real-time identification & processing engines for immediate end to end data distribution.

A marker is positioned within a boarder of a video stream, such as an advertisement, television show, movie, or the like. Entities will embed brand details along with other metadata in the marker on the borders of the video stream to run in open spaces. A key is used to embed the marker and will be provided in the application designed for reading this information and will be repurposed across all video streams via a user device.

A user device may utilize its camera function to identify the marker using steganalysis. The user device is then transformed to allow for passing of information to provide real-time data using the hardware associated with the user device. The scanning of the marker identifies a location, time, product, promotion, or the like associated with the product or service on the video stream. As such, the user who as an application installed on the user device will have ability to use live stream of a video and using steganalysis detect hidden message in a stego to identify the brand/product/location. Since the data to be read is available in the borders and is spread throughout multiple times, low resolution or video grabs from distance will not impact identification of the target product.

A combination narrowband Internet-of-thing (NB-IoT) and computational memory computing creates a unique in user device computing of various variable inputs to provide real-time data and recommendations to the user.

NB-IoT is a radio access technology designed to broaden the capacity and enhance the efficiency of communication channels. It operates in licensed spectrum and offers a single carrier frequency. NB-IoT is a subset of LTE (Long Term Evolution) technology but operates independently of the mobile network. This independence means that it does not rely on a gateway to function, enabling direct communication with the main network. The use of NB-IoT optimizes transmission methods and extended discontinuous reception cycles and demonstrate enhanced power efficiency, resulting in a longer battery life, which can extend up to ten years depending on the use case. The bandwidth associated with NB-IoT is constrained to a narrowband frequency of 200 kHz. This narrow bandwidth ensures efficient spectral usage, particularly beneficial for applications that transmit small amounts of data intermittently. Furthermore, NB-IoT has incorporated advanced security protocols to safeguard data transmission. These include robust encryption mechanisms and multi-layered authentication procedures. This multifaceted approach ensures data integrity, device authentication, and protection against potential external threats.

Computational memory computing (such as memcomputing) is a non-turing paradigm of computation that employs memory elements to both store and process information simultaneously. This approach is inspired by the functioning of the human and aims to solve complex problems more efficiently than traditional computing methods. Computational memory computing is particularly useful for optimization and satisfiability problems, offering potential advantages in computational speed and energy efficiency. The computational memory computing processors are the fundamental units in computational memory computing, designed to perform both computation and data storage simultaneously. Unlike traditional processors that separate memory and processing units, these processors integrate these functions, thereby reducing the time and energy required for data transfer between storage and processing elements. The architecture of the processors is based on non-linear dynamical systems, and they can be implemented using various types of physical systems, such as user electronic circuits or optical devices associated with user devices.

A unique preference for the user is generated based on contextual information derived from NB-IoT. Using narrowband for the distribution of information from an entity to an application allows for constant transition of information without effecting the memory and/or processing of the user device or without using any entity network that may require security and firewall passage. As such, data does not have to be transmitted back to entity servers which eliminates low/poor cellular/data connectivity challenges.

Using user device location information, the temporal data provides details of nearby products, services, or activities which can be rendered and integrated with geospatial linked data to provide recommendation. These can be presented using computational memory computing which also reduces latency for output services on the video stream and allowing for user side computing avoiding possible malicious items entering entity servers.

FIGS. 1A-1C illustrate technical components of an exemplary distributed computing environment for steganalysis detection of metadata in a video stream 100, in accordance with an embodiment of the disclosure. As shown in FIG. 1A, the distributed computing environment 100 contemplated herein may include a system 130, an end-point device(s) 140 such as user devices, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The end-point device(s) 140 may represent various forms of electronic devices, including user devices, user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. In some embodiments, the network 110 may include a telecommunication network, local area network (LAN), a wide area network (WAN), and/or a global area network (GAN), such as the Internet. Additionally, or alternatively, the network 110 may be secure and/or unsecure and may also include wireless and/or wired and/or optical interconnection technology. The network 110 may include one or more wired and/or wireless networks. For example, the network 110 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, storage device 106, a high-speed interface 108 connecting to memory 104, high-speed expansion points 111, and a low-speed interface 112 connecting to a low-speed bus 114, and an input/output (I/O) device 116. The system 130 may also include a high-speed interface 108 connecting to the memory 104, and a low-speed interface 112 connecting to low-speed port 114 and storage device 106. Each of the components 102, 104, 106, 108, 111, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system. The processor 102 may process instructions for execution within the system 130, including instructions stored in the memory 104 and/or on the storage device 106 to display graphical information for a GUI on an external input/output device, such as a display 116 coupled to a high-speed interface 108. In some embodiments, multiple processors, multiple buses, multiple memories, multiple types of memory, and/or the like may be used. Also, multiple systems, same or similar to system 130, may be connected, with each system providing portions of the necessary operations (e.g., as a server bank, a group of blade servers, a multi-processor system, and/or the like). In some embodiments, the system 130 may be managed by an entity, such as a business, a merchant, a financial institution, a card management institution, a software and/or hardware development company, a software and/or hardware testing company, and/or the like. The system 130 may be located at a facility associated with the entity and/or remotely from the facility associated with the entity.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 may store information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the network 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel and/or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, the memory may appear to be allocated from a central pool of memory, even though the memory space may be distributed throughout the system. Such a method of dynamically allocating memory provides increased flexibility when the data size changes during the lifetime of an application and allows memory reuse for better utilization of the memory resources when the data sizes are large.

The high-speed interface 108 manages bandwidth-intensive operations for the system 130, while the low-speed interface 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed interface 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router (e.g., through a network adapter).

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 156, 158, 160, 162, 164, 166, 168 and 170, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor 152 may be implemented as a chipset of chips that include separate and multiple analog and digital processors. The processor 152 may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156 (e.g., input/output device 156). The display 156 may be, for example, a Thin-Film-Transistor Liquid Crystal Display (TFT LCD) or an Organic Light Emitting Diode (OLED) display, or other appropriate display technology. An interface of the display may include appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a Single In Line Memory Module (SIMM) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner. In some embodiments, the user may use applications to execute processes described with respect to the process flows described herein. For example, one or more applications may execute the process flows described herein. In some embodiments, one or more applications stored in the system 130 and/or the user input system 140 may interact with one another and may be configured to implement any one or more portions of the various user interfaces and/or process flow described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, GPRS, and/or the like. Such communication may occur, for example, through transceiver 160. Additionally, or alternatively, short-range communication may occur, such as using a Bluetooth, Wi-Fi, near-field communication (NFC), and/or other such transceiver (not shown). Additionally, or alternatively, a Global Positioning System (GPS) receiver module 170 may provide additional navigation-related and/or location-related wireless data to user input system 140, which may be used as appropriate by applications running thereon, and in some embodiments, one or more applications operating on the system 130.

Further, communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications.

In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

As used herein, the development environment may refer to an environment where users (e.g., technicians, managers, third parties, developers, coders, and/or the like) may make changes to the degradation determination system. In some embodiments, the development environment may include a controlled setting environment where the users may write, debug, test, configure, reconfigure, and/or the like, the degradation determination system. Further, the development environment may include Integrated Development Environments (IDEs), version control systems, debugging tools, and/or the like. In some embodiments, the development environment may include data that includes data prepared for testing, debugging, configuring, reconfiguring, and/or the like. In some embodiments, the applications may be transferred from the development environment to a staging environment (e.g., pre-production environment), a testing environment (e.g., for rigorous testing of the system), and/or the like.

FIG. 2 illustrates a process flow for real-time data presentation resulting from steganalysis detection of metadata in a video stream 400, in accordance with an embodiment of the disclosure. As illustrated in block 402, the process 400 is initiated by a consortium of entities. The entities may be retailers that offer a good or service to users and/or advertise for a good or service. The entities issue an encrypted code, as illustrated in block 404. The encrypted code provides information about the product or service, offers for the product or service, locations for the product or service, and the like. The encrypted code is then embedded into a video stream associated with the entity as a marker, as illustrated in block 406. The marker is steganographically embedded into the video stream, as illustrated in block 408. Steganography is the technique of hiding the encrypted code with data within an ordinary non-secret video boarder to avoid detection, the code can then be extracted and decrypted using a key.

The marker is within the video stream and requires a user device to scan for activation. As illustrated in block 410 the intake channel or user device scans the live stream of the steganography embedded video stream. This is done via a camera associated with the user device. An application recognizes the marker and is opened.

On the backend and using the user device processors the system extracts the entity offers and promotions associated with the product or service encrypted in the marker. This may include offers, promotions, discounts, appropriate payment channel, location of product or service, and the like for purchasing of the product or service. Furthermore, as illustrated in block 414, the process 400 continues by initiating NB-IoT integration and application identification. NB-IoT allows for the entity to provide real-time contextual information about a product or service. Using NB-IoT for the distribution of information from an entity to an application allows for constant transition of information without effecting the memory and/or processing of the user device or without using any entity network that may require security and firewall passage. As such, data does not have to be transmitted back to entity servers which eliminates low/poor cellular/data connectivity challenges. This also allows for geocodes based on the location of the user device. Allowing for location specific data to be presented to the user. Using user device location information, the temporal data provides details of nearby products, services, or activities which can be rendered and integrated with geospatial linked data to provide recommendation. These can be presented using computational memory computing which also reduces latency for output services on the video stream and allowing for user side computing avoiding possible malicious items entering entity servers.

As illustrate in block 416, the entity continuously broadcasts data. As illustrated in block 418 the NB-IoT allows for a one-way transmission of encrypted codes with the real-time data from the entity. Other methods require sending data to a server and, especially in the case of video stream, a network signal has to be strong enough to transfer larger data packets, which may not be possible in all situations.

Finally, as illustration in block 420, the process 400 is completed upon decrypting and displaying the real-time data. The decryption is key based using an application on the user device. The real-time data that is displayed is real-time information, offers, promotions, payment options, locations, and the like associated with a product or service from the video stream. Furthermore, using user device location information and computational memory computing, the temporal data provides details of nearby products, services, or activities which can be rendered and integrated with geospatial linked data to provide recommendation.

FIG. 3 illustrates a process flow for triggering steganalysis detection of metadata in a video stream 500, in accordance with an embodiment of the disclosure. As illustrated there is an encoder associated with an entity for encoding code into markers for steganography identification. The encoder identifies the cover image 504 in a video stream such as a product or service, generates a secret message 506 such as information about the product, location, or a discount, and includes a key 508 for decoding the encrypted data. The encoder then embeds the data 510 into a video stream as a steganography image 512.

As illustrated in block 502, the process 500 is initiated by the user device receiving an input video stream with a marker. The user device scan of a marker triggers application activation and initiates data retriever 514 associated with a decoder within the user device. The key 516 is then used to decrypt the encrypted message and reveal the secret message 518.

The message along with user device information is combined to generate an output 532. These include user preferences 526, which include learned products or services along with user location preferences, user resource preferences, and the like. Furthermore, the user device information includes what intake channel 522 is utilized for receiving the input. Location data 523 identifies a current location of the user and common locations associated with the user. Application identification 530 includes an application that the user is utilizing for banking and/or identification of the marker. Finally, NB-IoT is integrated 524 for transmission of data from the entity to the user device in real-time. The decoded message along with the user device information is processed via computational memory computing 520 to generate an output 532 to display in the user device.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for steganalysis detection of metadata in a video stream, the system comprising:

a consortium of entities, wherein an entity of the consortium of entities comprises a first non-transitory storage device containing a first plurality of instructions and a first processing device that executes the first plurality of instructions; and a user device, wherein the user device comprises a second non-transitory storage device containing a second plurality of instructions and a second processing device that executes the second plurality of instructions;

wherein the first plurality of instructions when executed by the first processing device performs the steps of:

creating the consortium of entities with access to generate an encrypted code for a product or service presented on the video stream;

embedding the encrypted code as a marker on a border of the video stream; and transmitting encrypted codes with real-time contextual data via a one-way transmission using narrowband Internet-of-Things (NB-IoT), wherein the encrypted codes comprise the encrypted code;

wherein the second plurality of instructions when executed by the second processing device performs the steps of:

scanning, using the user device, the video stream with the marker embedded;

opening an application associated with the marker on the user device;

integrating the NB-IoT to allow for entities of the consortium of entities to broadcast;

allowing user device decryption of the encrypted codes using a key associated with the application associated with the marker;

determining user preference data via user device location information and computational memory computing; and displaying output of the real-time contextual data and the user preference data to a user via a display on the user device.

2. The system of claim 1, wherein integrating NB-IoT further comprises using NB-IoT for the consortium of entities to provide the real-time contextual information about the product or the service without interrupting the memory and processing of the user device and without using an entity network.

3. The system of claim 1, wherein the real-time contextual data comprises real-time product or service information, opportunities, and locations for access of the product or the service from the entity associated with the consortium of entities.

4. The system of claim 1, wherein the user preference data further comprises user device temporal preference data and computational memory computing data.

5. The system of claim 1, wherein embedding the encrypted code as the marker on the video stream further comprises using steganography to embed the encrypted code as the marker.

6. The system of claim 1, wherein the encrypted code for the product or the service on the video stream further comprises information about the product or the service, offers for the product or the service, and locations for the product or the service.

7. The system of claim 1, wherein the computational memory computing further comprises employing memory elements from the user device to both store and process user preferences for the user preference data.

8. A system for steganalysis detection of metadata in a video stream, the system comprising:

a consortium of entities, wherein an entity of the consortium of entities comprises a first processing device and a first computer program product, wherein the first computer program product comprises a first non-transitory computer-readable medium containing a first plurality of instructions; and a user device, wherein the user device comprises a second processing device and a second computer program product, wherein the second computer program product comprises a second non-transitory computer-readable medium containing a second plurality of instructions;

wherein the first plurality of instructions when executed by the first processing device performs the steps of:

creating the consortium of entities with access to generate an encrypted code for a product or service presented on the video stream;

embedding the encrypted code as a marker on a border of the video stream; and transmitting encrypted codes with real-time contextual data via a one-way transmission using narrowband Internet-of-Things (NB-IoT), wherein the encrypted codes comprise the encrypted code;

wherein the second plurality of instructions when executed by the second processing device performs the steps of:

scanning, using the user device, the video stream with the marker embedded;

opening an application associated with the marker on the user device;

integrating the NB-IoT to allow for entities of the consortium of entities to broadcast;

allowing user device decryption of the encrypted codes using a key associated with the application associated with the marker;

determining user preference data via user device location information and computational memory computing; and displaying output of the real-time contextual data and the user preference data to a user via a display on the user device.

9. The system of claim 8, wherein integrating NB-IoT further comprises using NB-IoT for the consortium of entities to provide the real-time contextual information about the product or the service without interrupting memory and processing of the user device and without using an entity network.

10. The system of claim 8, wherein the real-time contextual data comprises real-time product or service information, opportunities, and locations for access of the product or the service from the entity associated with the consortium of entities.

11. The system of claim 8, wherein the user preference data further comprises user device temporal preference data and computational memory computing data.

12. The system of claim 8, wherein embedding the encrypted code as the marker on the video stream further comprises using steganography to embed the encrypted code as the marker.

13. The system of claim 8, wherein the encrypted code for the product or the service on the video stream further comprises information about the product or the service, offers for the product or the service, and locations for the product or the service.

14. The system of claim 8, wherein the computational memory computing further comprises employing memory elements from the user device to both store and process user preferences for the user preference data.

15. A method for steganalysis detection of metadata in a video stream, the method comprising:

creating a consortium of entities with access to generate an encrypted code for a product or service presented on the video stream;

embedding the encrypted code as a marker on a bearder border of the video stream;

scanning, using a user device, the video stream with the marker embedded;

opening an application associated with the marker on the user device;

integrating narrowband Internet-of-Things (NB-IoT) to allow for entities of the consortium of entities to broadcast;

transmitting encrypted codes with real-time contextual data via a one-way transmission using the NB-IoT;

allowing user device decryption of the encrypted codes using a key associated with the application associated with the marker;

determining user preference data via user device location information and computational memory computing; and displaying output of the real-time contextual data and the user preference data to a user via a display on the user device.

16. The method of claim 15, wherein integrating NB-IoT further comprises using NB-IoT for the consortium of entities to provide the real-time contextual information about the product or the service without interrupting the memory and processing of the user device and without using an entity network.

17. The method of claim 15, wherein the real-time contextual data comprises real-time product or service information, opportunities, and locations for access of the product or the service from the entity associated with the consortium of entities.

18. The method of claim 15, wherein the user preference data further comprises user device temporal preference data and computational memory computing data.

19. The method of claim 15, wherein embedding the encrypted code as the marker on the video stream further comprises using steganography to embed the encrypted code as the marker.

20. The method of claim 15, wherein the encrypted code for the product or the service on the video stream further comprises information about the product or the service, offers for the product or the service, and locations for the product or the service.

* * * * *